(12) United States Patent
Krause et al.

(10) Patent No.: US 9,312,962 B2
(45) Date of Patent: Apr. 12, 2016

(54) INTENSITY-BASED MODULATOR

(71) Applicant: Infinera Corporation, Sunnyvale, CA (US)

(72) Inventors: David J. Krause, Nepean (CA); Damien Lambert, Sunnyvale, CA (US); Masaki Kato, Palo Alto, CA (US); Vikrant Lal, Sunnyvale, CA (US); Radhakrishnan L. Nagarajan, Cupertino, CA (US); Mehrdad Ziari, Pleasanton, CA (US); Fred A. Kish, Jr., Palo Alto, CA (US); John D. McNicol, Ottawa (CA); Han Henry Sun, Ottawa (CA); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 13/675,246

(22) Filed: Nov. 13, 2012

(65) Prior Publication Data

US 2014/0133868 A1    May 15, 2014

(51) Int. Cl.
| | |
|---|---|
| *H04B 10/50* | (2013.01) |
| *H04B 10/516* | (2013.01) |
| *H04B 10/54* | (2013.01) |
| *H04B 10/548* | (2013.01) |

(52) U.S. Cl.
CPC ........ *H04B 10/5161* (2013.01); *H04B 10/5051* (2013.01); *H04B 10/5053* (2013.01); *H04B 10/54* (2013.01); *H04B 10/548* (2013.01)

(58) Field of Classification Search
CPC .................... H04B 10/5053; H04B 10/5051
USPC .......................................................... 398/185
See application file for complete search history.

(56) References Cited

U.S. PATENT DOCUMENTS

| | | | | |
|---|---|---|---|---|
| 6,038,357 | A * | 3/2000 | Pan ................................ | 385/24 |
| 6,904,240 | B1 * | 6/2005 | Suga et al. ...................... | 398/79 |
| 7,636,501 | B2 | 12/2009 | Doerr et al. | |
| 7,873,284 | B2 * | 1/2011 | Chen et al. .................... | 398/183 |

(Continued)

OTHER PUBLICATIONS

C. R. Doerr et al.; "Compact High-Speed InP DQPSK Modulator"; IEEE Photonics Technology Letters; vol. 19; No. 15; Aug. 1, 2007; 3 pages.
C. R. Doerr et al.; "28-Gbaud InP Square or Hexagonal 16-QAM Modulator"; Optical Society of America; 2011; 3 pages.

*Primary Examiner* — Shi K Li
(74) *Attorney, Agent, or Firm* — Harrity & Harrity LLP; David L. Soltz

(57) ABSTRACT

An optical modulator includes a splitter, phase modulators, amplitude modulators, intensity modulators, and a combiner. The splitter is configured to receive light, and split the light into portions of the light. Each of the phase modulators is configured to receive a corresponding one of the portions of the light, and modulate a phase of the portion of the light to provide a phase-modulated signal. Each of the amplitude modulators is configured to receive a corresponding one of the phase-modulated signals, and modulate an amplitude of the phase-modulated signal to provide an amplitude-modulated signal. Each of the intensity modulators is configured to receive a corresponding one of the amplitude-modulated signals, and modulate an intensity of the amplitude-modulated signals to provide an intensity-modulated signal. The combiner is configured to receive the intensity-modulated signals, combine the intensity-modulated signals into a combined signal, and output the combined signal.

7 Claims, 12 Drawing Sheets

(56) References Cited

U.S. PATENT DOCUMENTS

| | | | |
|---|---|---|---|
| 2005/0220457 A1* | 10/2005 | Fujiwara et al. | 398/186 |
| 2006/0147219 A1* | 7/2006 | Yoshino et al. | 398/183 |
| 2006/0209389 A1* | 9/2006 | Hall et al. | 359/320 |
| 2009/0220235 A1 | 9/2009 | Joyner et al. | |
| 2010/0166424 A1* | 7/2010 | Nagarajan et al. | 398/79 |
| 2012/0177384 A1* | 7/2012 | Ryf | 398/202 |
| 2013/0089339 A1* | 4/2013 | Liu et al. | 398/152 |
| 2014/0079391 A1* | 3/2014 | Kim et al. | 398/30 |

* cited by examiner

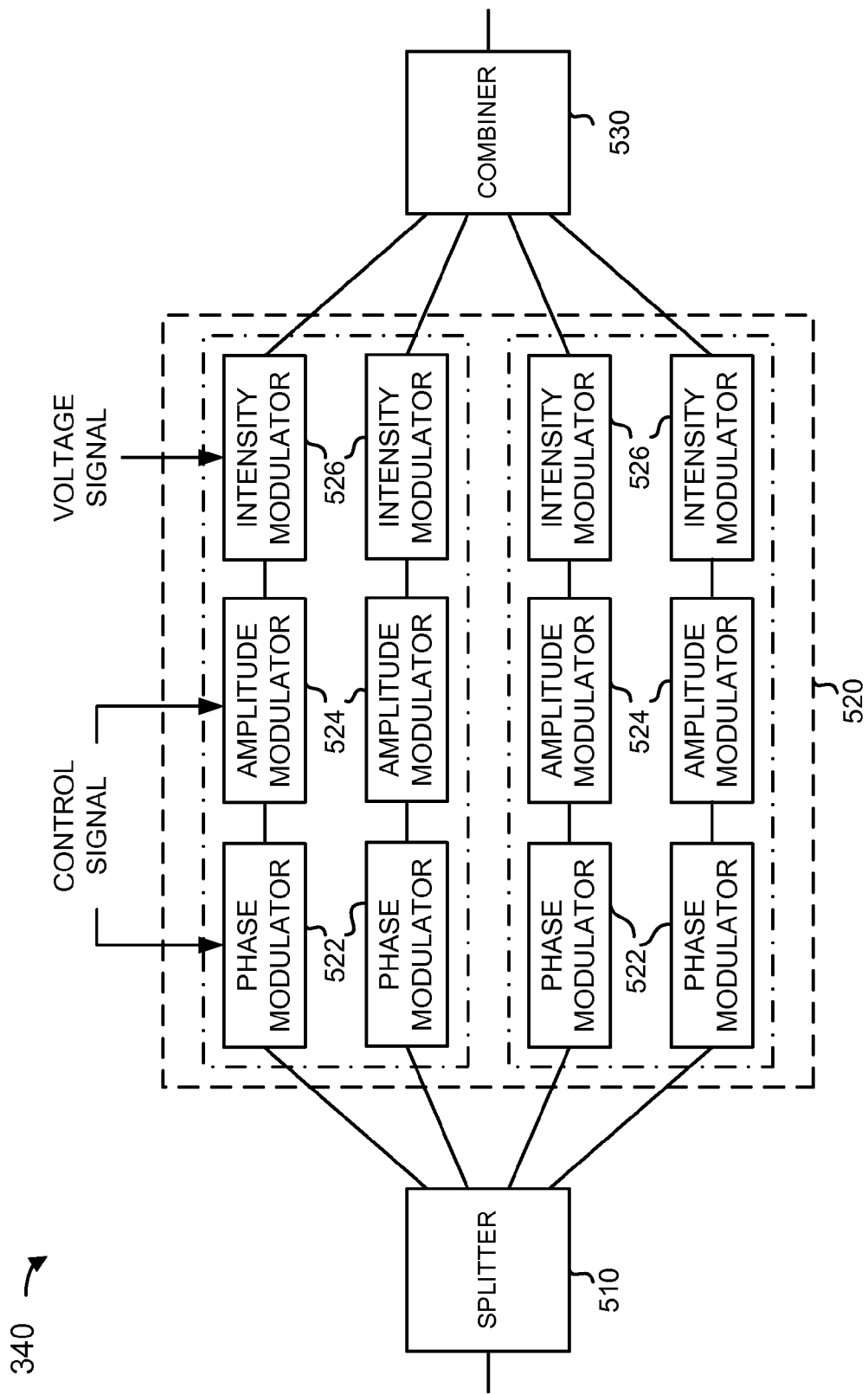

INTENSITY-BASED MODULATOR

BACKGROUND

Wavelength division multiplexed (WDM) optical communication systems (referred to as "WDM systems") are systems in which multiple optical signals, each having a different wavelength, are combined into a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals. Additionally, the receiver circuit may include receiver components to convert the optical signals into electrical signals, and output the data carried by those electrical signals.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, or various polymers and semiconductor materials which are used to make semiconductor lasers, such as GaAs and InP.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs. The spacing, between the channels, may be less than 200 GHz, in order to tightly pack the channels together to form a super-channel.

SUMMARY

According to some example implementations, an optical system may include a transmitter module. The transmitter module may include a laser configured to output light, and an optical modulator. The optical modulator may include a splitter, a group of phase modulators, a group of amplitude modulators, a group of intensity modulators, and a combiner. The splitter may receive the light, and split the light into multiple portions of the light. The phase modulators may receive the portions of the light, and modulate phases of the portions of the light to provide phase-modulated signals. The amplitude modulators may receive the phase-modulated signals, and modulate amplitudes of the phase-modulated signals to provide amplitude-modulated signals. The intensity modulators may receive the amplitude-modulated signals, and modulate intensities of the amplitude-modulated signals to provide intensity-modulated signals. The combiner may receive the intensity-modulated signals, combine the intensity-modulated signals into a combined signal, and output the combined signal.

According to some example implementations, an optical system may include a transmitter module. The transmitter module may include a processor, a digital-to-analog converter, a laser, and an optical modulator. The processor may receive input data, and generate input values based on the input data. The digital-to-analog converter may receive the input values from the processor, generate voltage signals based on the input values, and output the voltage signals. The laser may output light. The optical modulator may include a group of phase modulators, a group of amplitude modulators, and group of intensity modulators. One of the phase modulators may receive the light, and modulate a phase of the light to provide a phase-modulated signal. One of the amplitude modulators may receive the phase-modulated signal, and modulate an amplitude of the phase-modulated signal to provide an amplitude-modulated signal. One of the intensity modulators may receive the amplitude-modulated signal, receive the voltage signals from the digital-to-analog converter, modulate an intensity of the amplitude-modulated signal, based on the voltage signals, to provide an intensity-modulated signal, and output the intensity-modulated signal.

According to some example implementations, a transmitter module may include a processor, a digital-to-analog converter, a first modulator, a second modulator, and a combiner. The processor may receive input data, and generate input values based on the input data. The digital-to-analog converter may receive the input values from the processor, and generate first and second sets of voltage signals based on the input values. The first modulator may receive first light and the first set of voltage signals, split the first light into portions of the first light, modulate an intensity of each of the portions of the first light, based on the first set of voltage signals, to provide first modulated optical signals, and combine the first modulated optical signals into a first optical signal. The second modulator may receive second light and the second set of voltage signals, split the second light into portions of the second light, modulate an intensity of each of the portions of the second light, based on the second set of voltage signals, to provide second modulated optical signals, and combine the second modulated optical signals into a second optical signal. The combiner may receive the first optical signal and the second optical signal, combine the first optical signal and the second optical signal to provide a combined signal, and output the combined signal.

According to some example implementations, an optical modulator may include a splitter, a group of phase modulators, a group of amplitude modulators, a group of intensity modulators, and a combiner. The splitter may receive light, and split the light into portions of the light. Each of the phase modulators may receive a corresponding one of the portions of the light, and modulate a phase of the corresponding one of the portions of the light to provide a phase-modulated signal. Each of the amplitude modulators may receive a corresponding one of the phase-modulated signals, and modulate an amplitude of the corresponding one of the phase-modulated signals to provide an amplitude-modulated signal. Each of the intensity modulators may receive a corresponding one of the amplitude-modulated signals, and modulate an intensity of a corresponding one of the amplitude-modulated signals to provide an intensity-modulated signal. The combiner may receive the intensity-modulated signals, combine the intensity-modulated signals into a combined signal, and output the combined signal.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 5 is a diagram illustrating example components of the modulator shown in FIG. 3;

DETAILED DESCRIPTION

The following detailed description refers to the accompanying drawings. The same reference numbers in different drawings may identify the same or similar elements. Also, the following detailed description does not limit the disclosure.

An optical system, as described herein, may include a push-pull intensity-based complex plane modulator. The intensity-based modulator may provide for a higher density integration of optical devices over a modulator based on phase modulation in a nested Mach-Zehnder modulator structure. The intensity-based modulator may provide other certain advantages for a PIC device (with, for example, lasers, arrayed waveguide gratings, polarization beam rotators, etc.). These advantages may include simpler modulator fabrication, smaller overall size of the whole PIC, and ease of high-speed modulator design over existing modulators, such as nested Mach-Zehnder modulators.

Figure 1:
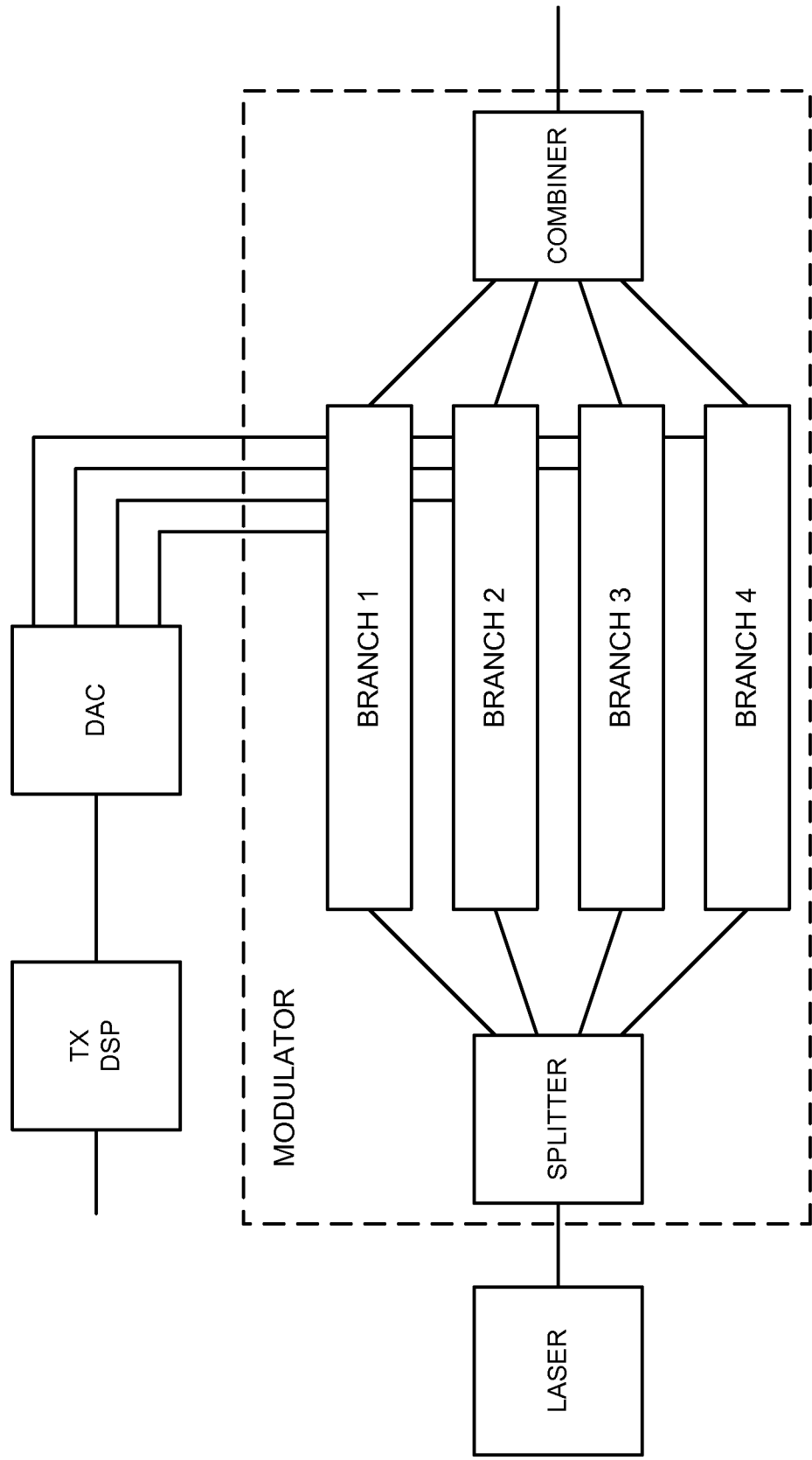
FIG. 1 is a diagram illustrating an overview of an example implementation described herein.

FIG. 1 is a diagram illustrating an overview of an example implementation described herein. As shown in FIG. 1, a transmitter structure may include a transmitter (TX) digital signal processor (DSP), a digital-to-analog converter (DAC), a laser, and a four-branch modulator. Generally, the TX DSP may receive input data and process the input data to determine what analog voltages need to be applied to the modulator to achieve the desired optical signal. The TX DSP may also perform some pulse shaping, where each one and zero, in the input data, would correspond to some pulse as a function of time. The TX DSP may provide the appropriate integers to the DAC and the DAC may generate the voltage signals to provide to the modulator.

The modulator may include a splitter, four modulator branches, and a combiner. The splitter may receive light from the laser, split the light into four portions of light, and provide each of the four portions of light to a respective one of the four modulator branches. Each of the four modulator branches may modulate the respective portion of light based on the voltage signal received from the DAC. In some implementations, a modulator branch may perform phase modulation, amplitude modulation, and/or intensity modulation on a portion of light to generate a modulated signal. The combiner may combine the modulated signals from the four modulator branches into an output optical signal and output the output optical signal.

Such a transmitter structure may be simpler in that the transmitter structure may contain fewer components than existing transmitters. Fewer components may lead to a reduction in the size and complexity of a photonic integrated circuit on which the transmitter structure is located. This may make the photonic integrated circuit cheaper to build and may improve the dependability of the photonic integrated circuit.

Figure 2:
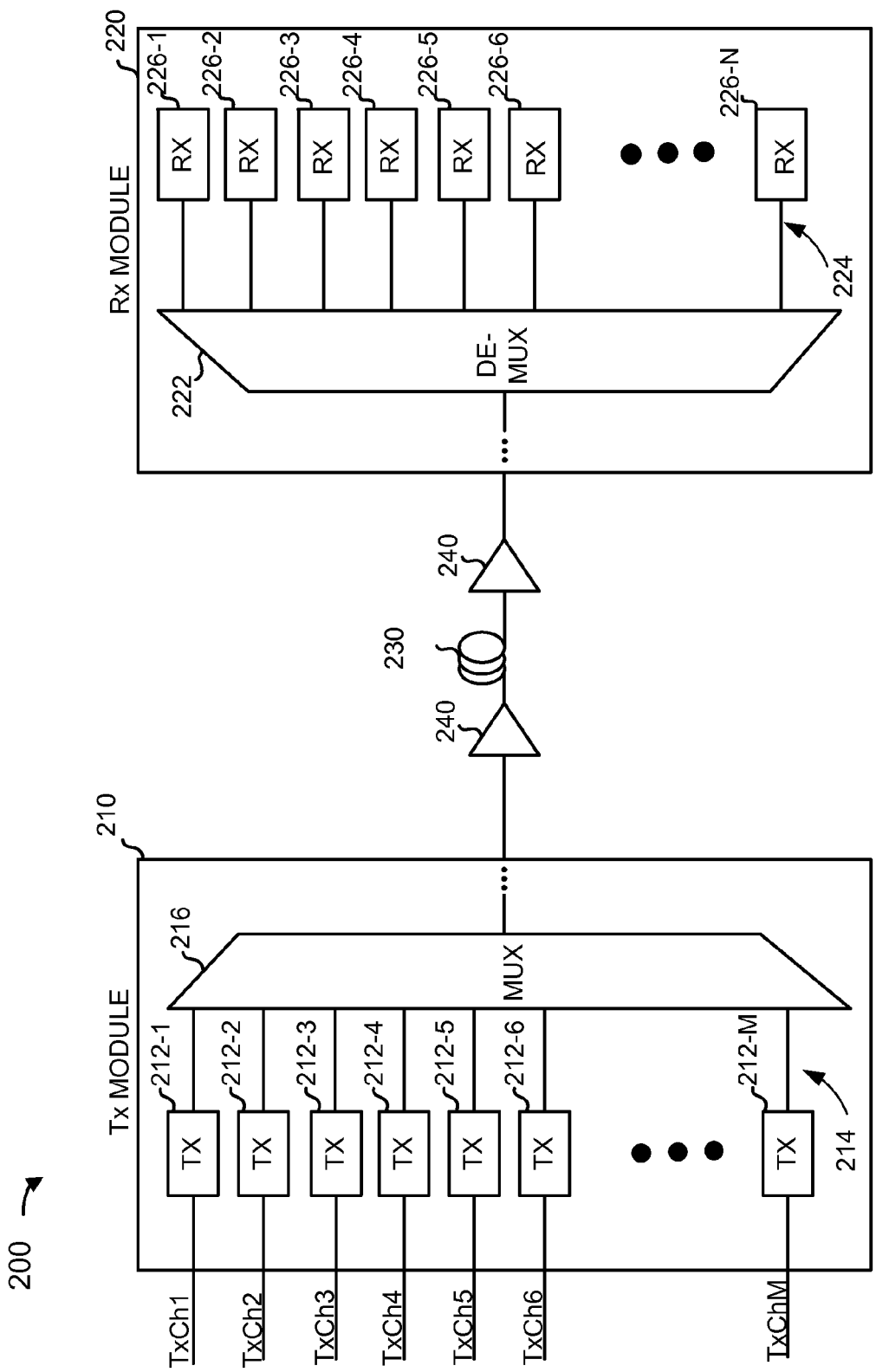
FIG. 2 is a diagram of an example network in which systems and/or methods, described herein, may be implemented.

FIG. 2 is a diagram of an example network 200 in which systems and/or methods described herein may be implemented. As illustrated in FIG. 2, network 200 may include transmitter (Tx) module 210 (e.g., a Tx PIC), and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), modulate the data with an optical signal to create an output optical signal, and transmit the output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super-channel.

In some implementations and as described above, each of optical transmitters 212 may include a TX DSP, a DAC, a laser, a modulator, and/or some other components. The laser and/or the modulator may be coupled with a tuning element, such as a heater, that can be used to tune the wavelength of the optical signal channel.

Waveguides 214 may include an optical link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexer device. In some implementations, optical multiplexer 216 may combine multiple output optical signals, associated with optical transmitters 212, into a single optical signal (e.g., a WDM signal). A corresponding waveguide may output the WDM signal to an optical fiber, such as link 230. For example, optical multiplexer 216 may include an input (e.g., a first slab to receive input optical signals supplied by optical transmitters 212) and an output (e.g., a second slab to supply a single WDM signal associated with the input optical signals). Optical multiplexer 216 may also include waveguides connected to the input and the output.

In some implementations, the first slab and the second slab may each act as an input and an output. For example, the first slab and the second slab may each receive multiple input optical signals (e.g., output optical signals supplied by optical transmitters 212). Additionally, the first slab may supply a single WDM signal corresponding to the input optical signals (e.g., output optical signals supplied by optical transmitters 212) received by the second slab. Further, the second slab may supply a single WDM signal corresponding to the input optical signals (e.g., output optical signals supplied by optical transmitters 212) received by the first slab. In some implementations, a corresponding waveguide may output the WDM signal to an optical fiber, such as link 230.

As shown in FIG. 2, optical multiplexer 216 may receive output optical signals outputted by optical transmitters 212, and output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization. In some other implementations, there may be F (F>2) WDM signals having F different polarizations.

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other demultiplexer device. Optical demultiplexer 222 may supply multiple optical signals based on receiving one or more optical signals, such as WDM signals, or components associated with the one or more optical signals. For example, optical demultiplexer 222 may include an input (e.g., a first slab to receive a WDM signal and/or some other input signal), and an output (e.g., a second slab to supply multiple optical signals associated with the WDM signal). Additionally, optical demultiplexer 222 may include waveguides connected to the first slab and the second slab.

In some implementations, the first slab and the second slab may each act as an input and an output. For example, the first slab and the second slab may each receive an optical signal (e.g., a WDM signal supplied by optical multiplexer 216 and/or some other optical signal). Additionally, the first slab may supply output optical signals corresponding to the optical signal received by the second slab. Further, the second slab may supply output optical signals corresponding to the optical signal received by the first slab. As shown in FIG. 2, optical demultiplexer 222 may supply optical signals to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, convert data, associated with the input optical signals, to voltage signals, convert the voltage signals to digital samples, and process the digital samples to produce output data corresponding to the input optical signals. Optical receivers 226 may each operate to convert the input optical signal to an electrical signal that represents the transmitted data. In some implementations, each of optical receivers 226 may include a local oscillator, a hybrid mixer, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the devices illustrated in FIG. 2 may perform a function described herein as being performed by another one of the devices illustrated in FIG. 2.

Figure 3:
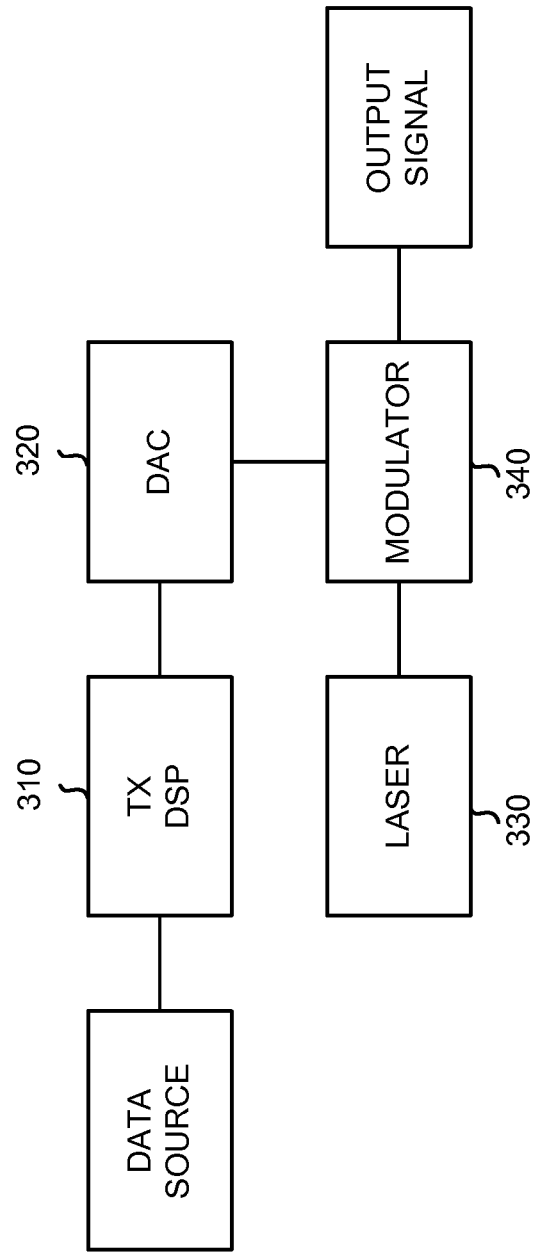
FIG. 3 is a diagram illustrating an example set of components of an optical transmitter shown in FIG. 2.

FIG. 3 is a diagram illustrating an example of components of an optical transmitter 212. As shown in FIG. 3, optical transmitter 212 may include a TX DSP 310, a DAC 320, a laser 330, and a modulator 340. In some implementations, TX DSP 310 and DAC 320 may be implemented on an application specific integrated circuit (ASIC) and/or may be implemented on a single integrated circuit, such as a single PIC. In some implementations, laser 330 and modulator 340 may be implemented on a single integrated circuit, such as a single PIC. In some other implementations, TX DSP 310, DAC 320, laser 330, and/or modulator 340 may be implemented on one or more integrated circuits, such as one or more ASICs and/or PICs. For example, in some example implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and determine the voltage signals to apply to modulator 340 to achieve the desired optical signal. TX DSP 310 may map the input data to output symbols, and calculate voltage signals needed to apply to modulator 340. TX DSP 310 may calculate symbols and define the trajectory between symbols. In some implementations, TX DSP 310 may calculate output samples at a rate higher than the symbol rate.

In some example implementations, TX DSP 310 may convert the input data from logical values to constellation points, such as QPSK, 16-QAM, etc. on the complex plane. TX DSP 310 may determine a pulse shape that defines the transitions between the constellation points. TX DSP 310 may, at a particular sample rate higher than the baud rate, calculate the desired electric field envelope of the optical signal. For a super-channel application, TX DSP 310 may choose a pulse shape that gives good spectral efficiency, such as raised-cosine pulse shapes. This pulse shape allows channels to be placed relatively close together across an allocated optical frequency range. TX DSP 310 may generate the appropriate integers (e.g., by solving an equation defining the transfer function of modulator 340 or by using a look-up table) to supply to DAC 320 for DAC 320 to generate the appropriate voltage signals to apply to modulator 340.

DAC 320 may include a digital-to-analog converter. In some implementations, DAC 320 may include a high-speed digital-to-analog converter, such as a digital-to-analog converter operating at speeds of 64 GSample/s or higher. DAC 320 may receive the sequence of integers and, based on the sequence of integers, generate voltage signals to apply to modulator 340.

Laser 330 may include a semiconductor laser, such as a distributed feedback (DFB) laser, or some other type of laser. Laser 330 may output light to modulator 340. In some implementations, laser 330 may output light directly to modulator 340. In some implementations, laser 330 may output light to modulator 340 via one or more other optical components.

Modulator 340 may include an intensity-based modulator. Modulator 340 may be used to generate quadrature phase shift keying (QPSK) or higher order modulation formats, such as quadrature-amplitude shift keying (QAM). In some implementations, modulator 340 may include four modulator branches. Each of the four modulator branches may include a phase modulator, an amplitude modulator, and an intensity modulator. Modulator 340 may receive the light from laser 330 and the voltage signals from DAC 320. Modulator 340 may split the light into portions of light, and separately modulate each of the portions of light, based on the voltage signals, to generate respective optical signals. Modulator 340 may combine the optical signals into an output optical signal and output the output optical signal.

In some implementations, the intensity modulator, of modulator 340, may include an electro-absorption modulator (EAM) or a semiconductor optical amplifier (SOA). Use of an intensity modulator does not limit the type of modulation that can be applied, and offers the benefit of simpler, overall optical integration with other optical components. Unlike the existing Mach Zehnder modulator, in this case, a high speed signal can be applied to a very small section of modulator 340 (e.g., 0.1 millimeter (mm) compared to 1 to 10 mm). This may function as a gate for signals that have a fixed phase relationship between them.

While FIG. 3 shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, and/or modulators 340 may be selected to implement an optical transmitter 212 with the desired characteristics. In some instances, one of the components illustrated in FIG. 3 may perform a function described herein as being performed by another one of the components illustrated in FIG. 3.

Figure 4:
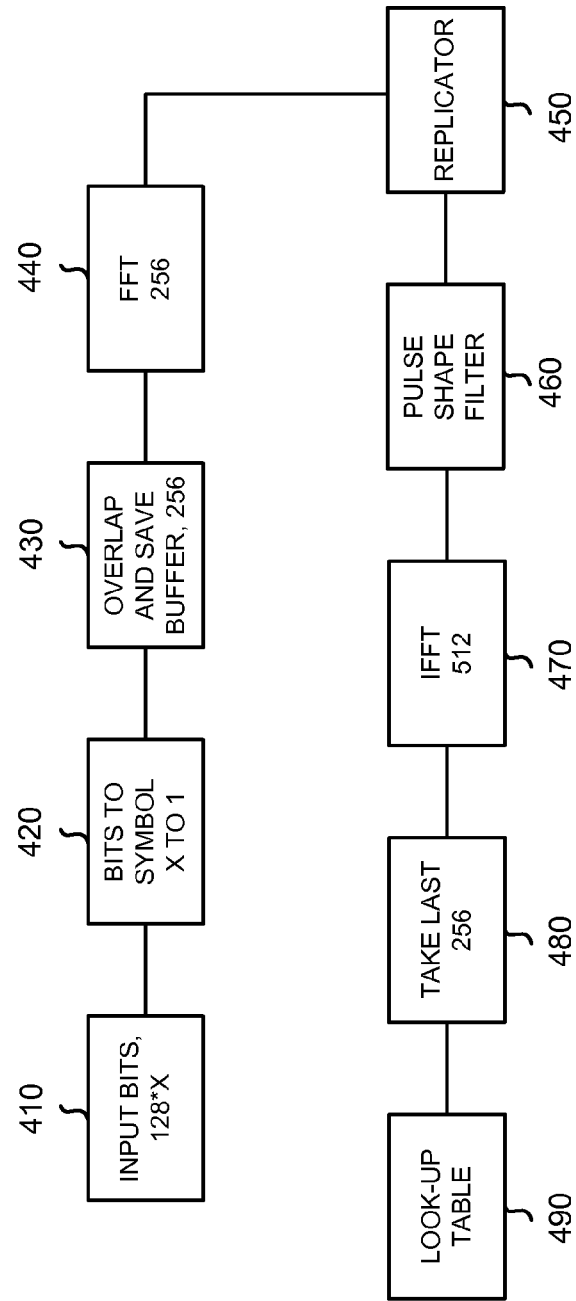
FIG. 4 is a diagram illustrating example functional components of the transmitter digital signal processor shown in FIG. 3.

FIG. 4 is a diagram illustrating example functional components of TX DSP 310. The particular functional components, which may be included in TX DSP 310, may vary based on desired performance characteristics and/or computational complexity.

As shown in FIG. 4, TX DSP 310 may include an input bits component 410, a bits to symbol component 420, an overlap and save buffer 430, a fast Fourier transfer (FFT) component 440, a replicator component 450, a pulse shape filter 460, an inverse FFT (IFFT) component 470, a take last 256 component 480, and a look-up table component 490.

Input bits component 410 may process 128*X bits at a time of the input data, where X is an integer. For dual-polarization Quadrature Phase Shift Keying (QPSK), X would be four. Bits to symbol component 420 may map the bits to symbols on the complex plane. For example, bits to symbol component 420 may map four bits to a symbol in the dual-polarization QPSK constellation. Overlap and save buffer 430 may buffer 256 symbols. Overlap and save buffer 430 may receive 128 symbols at a time from bits to symbol component 420. Thus, overlap and save buffer 430 may combine 128 new symbols, from bits to symbol component 420, with the previous 128 symbols received from bits to symbol component 420.

FFT component 440 may receive 256 symbols from overlap and save buffer 430, and may convert the symbols to the frequency domain using, for example, a fast Fourier transform (FFT). FFT component 440 may form 256 frequency bins as a result of performing the FFT. Replicator component 450 may replicate the 256 frequency bins to form 512 frequency bins. This replication may increase the sample rate.

Pulse shape filter 460 may apply a pulse shaping filter to the 512 frequency bins. The purpose of pulse shape filter 460 is to calculate the transitions between the symbols and shape the output spectrum of the channel so that channels can be packed together as a super-channel. Pulse shape filter 460 may also be used to introduce timing skew between the channels to correct for timing skew induced by link 230.

IFFT component 470 may receive the 512 frequency bins and return the signal back to the time domain, which may now be at the operating speed of DAC 320. IFFT component 470 may convert the signal to the time domain using, for example, an inverse fast Fourier transform (IFFT). Take last 256 component 480 may select the last 256 samples from IFFT component 470. Look-up table 490 may include a table that identifies the integers to supply to DAC 320 based on the samples from take last 256 component 480. In one example implementation, look-up table 490 may include electrical field values and associated voltage signals. Look-up table 490 may use the samples to identify and output the appropriate integers. As explained above, DAC 320 may generate voltage signals based on the integers from TX DSP 310.

While FIG. 4 shows TX DSP 310 as including a particular quantity and arrangement of functional components, in some implementations, TX DSP 310 may include additional functional components, fewer functional components, different functional components, or differently arranged functional components.

FIG. 5 is a diagram illustrating example components of modulator 340. As shown in FIG. 5, modulator 340 may include a splitter 510, a modulation component 520, and a combiner 530.

Splitter 510 may include an optical splitter, such as a 1×4 splitter, that receives input light from laser 330 and splits the light into first, second, third, and fourth portions of the light. In some implementations, the first, second, third, and fourth portions of light may have approximately equal power. In some other implementations, not all of the first, second, third, and fourth portions of light may have equal power. Splitter 510 may output the first, second, third, and fourth portions of light to modulation component 520.

Modulation component 520 may include four modulator branches. In some implementations, each modulator branch may include a phase modulator 522, an amplitude modulator 524, and an intensity modulator 526. In some implementations, the first and second modulator branches may be used to impart the real part of the modulation to the optical signal, and the third and fourth modulator branches may be used to impart the imaginary part of the modulation to the optical signal. Each of the modulator branches may output a modulated optical signal.

Phase modulator 522 may include a phase modulator that imparts a phase shift on a portion of light. In some example implementations, phase modulators 522, of the first and second modulator branches, may impart phases such that the difference in phases between the first and second modulator branches is approximately one hundred eighty (180) degrees; and phase modulators 522, of the third and fourth modulator branches, may impart phases such that the difference in phases between the third and fourth modulator branches is approximately one hundred eighty (180) degrees. In some example implementations, phase modulators 522, of the first and second modulator branches, may impart phases such that the difference in phases between one of the first and second modulator branches and one of the third and fourth modulator branches is approximately ninety (90) degrees; and phase modulators 522, of the third and fourth modulator branches, may impart phases such that the difference in phases between one of the third and fourth modulator branches and one of the first and second modulator branches is approximately ninety (90) degrees.

In one example implementation, phase modulator 522, of the first modulator branch, may impart approximately zero (0) degrees of optical phase; phase modulator 522, of the second modulator branch, may impart approximately one hundred eighty (180) degrees of optical phase; phase modulator 522, of the third modulator branch, may impart approximately ninety (90) degrees of optical phase; and phase modulator 522, of the fourth modulator branch, may impart approximately two hundred seventy (270) degrees of optical phase.

In some implementations, phase modulator 522 may operate based on a low frequency control signal. The control signal may be generated by an ASIC or a microcontroller that measures the output signal and generates the control signal to make any necessary changes in the phase.

Amplitude modulator 524 may include an amplitude modulator that modulates an amplitude of a portion of light. In some implementations, amplitude modulator 524, of the modulator branches, may modulate the amplitude of the portions of light to have approximately equal amplitude.

In some implementations, amplitude modulator 524 may operate based on a low frequency control signal. The control signal may be generated by an ASIC or a microcontroller that measures the output signal and generates the control signal to make any necessary changes in the amplitude. The ASIC or microcontroller, which generates the control signal for phase modulators 522, may be different from the ASIC or microcontroller that generates the control signal for amplitude modulators 524. Alternatively, the same ASIC or microcontroller may generate both control signals.

Intensity modulator 526 may include an intensity modulator that modulates an intensity of a portion of light. In some implementations, intensity modulator 526 may be an EAM or an SOA. In one example implementation, the EAM may be built on a silicon (Si) photonics platform, using germanium (Ge) or silicon-germanium (SiGe) for the absorption. Whether an EAM or an SOA is used is based on desired design characteristics and desired speed. Typically, EAMs are faster than SOAs. For the description to follow, it will be assumed that intensity modulator 526 includes an EAM—though the EAM could be replaced with an SOA.

In some implementations, intensity modulator 526 may apply modulation in a push-pull arrangement between the pair of modulators for the real part, and push-pull for the pair of modulators for the imaginary part. For example, according to an existing QPSK technique, the modulation for the real part may include non-return to zero (NRZ) coding. For an EAM-based modulator, to transmit a one (1), a first intensity modulator 526 may be set to pass-through and a second intensity modulator 526 may be set to attenuating. To transmit a zero (0), the second intensity modulator 526 may be set to pass-through, and the first intensity modulator 526 may be set to attenuating. For an SOA-based modulator, to transmit a one (1), a first intensity modulator 526 may be set to high gain and a second intensity modulator 526 may be set to low gain. To transmit a zero (0), the second intensity modulator 526 may be set to high gain and the first intensity modulator 526 may be set to low gain.

High speed modulation need not be on/off type modulation. By varying the applied voltage between the fully on/off state, the entire complex plane can be reached. This allows for QAM type modulation, pre-dispersion of the transmitted optical waveform, or analog-type (e.g., radio frequency (RF)) modulation to be transmitted. The source of the high speed RF modulation could be DAC 320 with many possible levels from on to off. The modulation applied could be calculated based on the result of calculations by TX DSP 310. In this case, a general complex plane modulator can be designed and built, and then new modulation formats can be generated using the modulator.

Combiner 530 may include an optical combiner or another type of optical multiplexing device, such as an AWG or a polarization beam combiner. Combiner 530 may receive the modulated optical signals from the modulator branches of modulation component 520, and combine the modulated optical signals to produce an output signal. In some implementations, combiner 530 may include some filtering properties to remove unwanted signals that exist outside of the desired optical frequency band.

While FIG. 5 shows modulator 340 as including a particular quantity and arrangement of components, in some implementations, modulator 340 may include additional components, fewer components, different components, or differently arranged components. Also, in some instances, one of the components illustrated in FIG. 5 may perform a function described herein as being performed by another one of the components illustrated in FIG. 5.

Figure 6A:
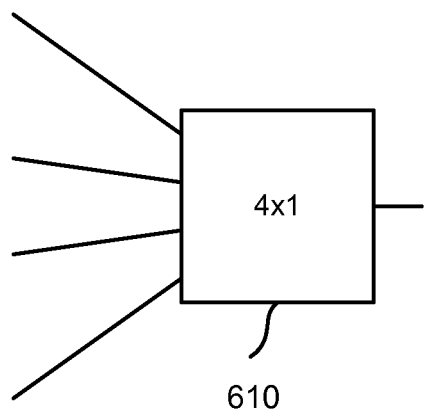
FIGS. 6A and 6B are diagrams of example components of the combiner shown in FIG. 5.

FIG. 6A is a diagram of example components of combiner 530. As shown in FIG. 6A, combiner 530 may include a combiner 610. Combiner 610 may include a 4×1 coupler that receives four modulated optical signals, optically combines the four modulated optical signals to produce an output signal, and outputs the output signal.

While FIG. 6A shows combiner 530 as including a particular component, in some implementations, combiner 530 may include additional components or different components.

Figure 6B:
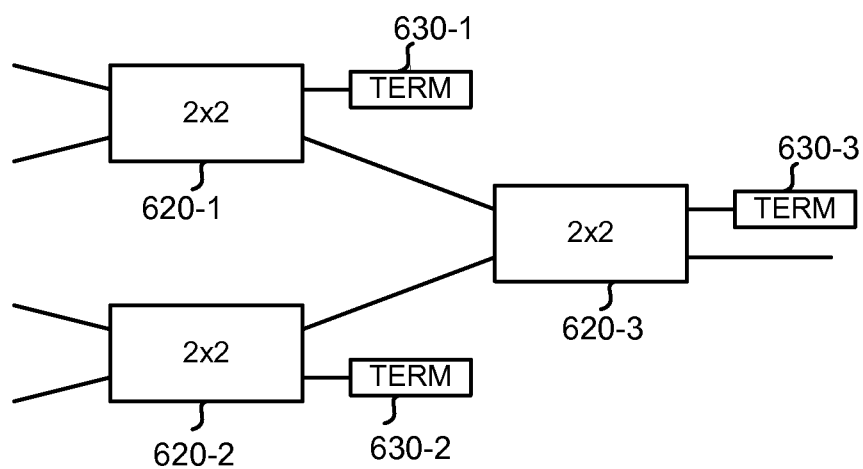

FIG. 6B is another diagram of example components of combiner 530. As shown in FIG. 6B, combiner 530 may include combiner 620-1, 620-2, and 620-3 (referred to generally as combiners 620 and individually as combiner 620) and terminators 630-1, 630-2, and 630-3 (referred to generally as terminators 630 and individually as terminator 630).

Combiner 620 may include a 2×2 coupler that includes two inputs and two outputs. In some implementations, combiner 620 may receive two modulated optical signals at the two inputs, optically combine the two modulated optical signals to produce an output signal, and output the output signal at a first output of the two outputs. As shown in FIG. 6B, the outputs of combiners 620-1 and 620-2 may be used as the inputs to combiner 620-3.

In addition to outputting the output signal, combiner 620 may output unwanted light at a second output of the two outputs. This unwanted light may interfere with optical signals received and/or processed by optical components in transmitter module 210. Terminators 630 may include a passive structure to absorb the unwanted light. Terminators 630 may have various sizes, widths, and shapes. Terminators 630 may connect to the second outputs of combiners 620.

While FIG. 6B shows combiner 530 as including particular components, in some implementations, combiner 530 may include additional components, fewer components, different components, or differently arranged components.

Figure 7:
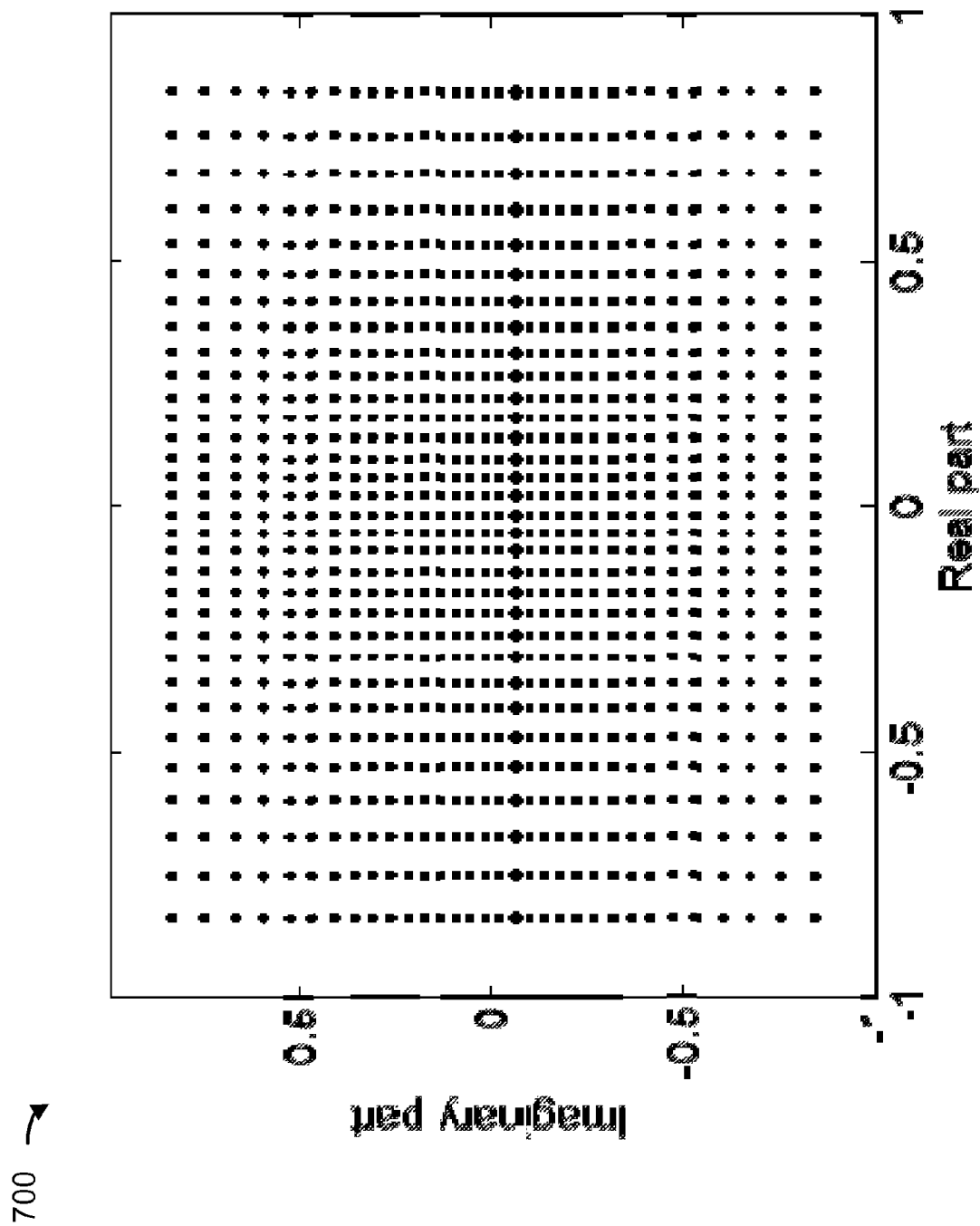
FIG. 7 illustrates an example of a graph showing an accessible portion of the complex plane.

FIG. 7 illustrates an example of a graph 700 showing an accessible portion of the complex plane. As an example of the region accessible on the complex plane, consider EAMs with on/off ratio of 16 dB or greater, and zero (or minimal) chirp. In this case, for equal voltage steps applied, graph 700 may show the accessible region on the complex plane. As shown in graph 700, modulator 340 may have a characteristic of denser constellation points near the origin (0+j0) than at the boundaries (normalized, 1+1j).

While FIG. 7 shows graph 700 as having a particular arrangement of constellation points in the complex plane, in some implementations, graph 700 may have a different arrangement of constellation points.

Figure 8:
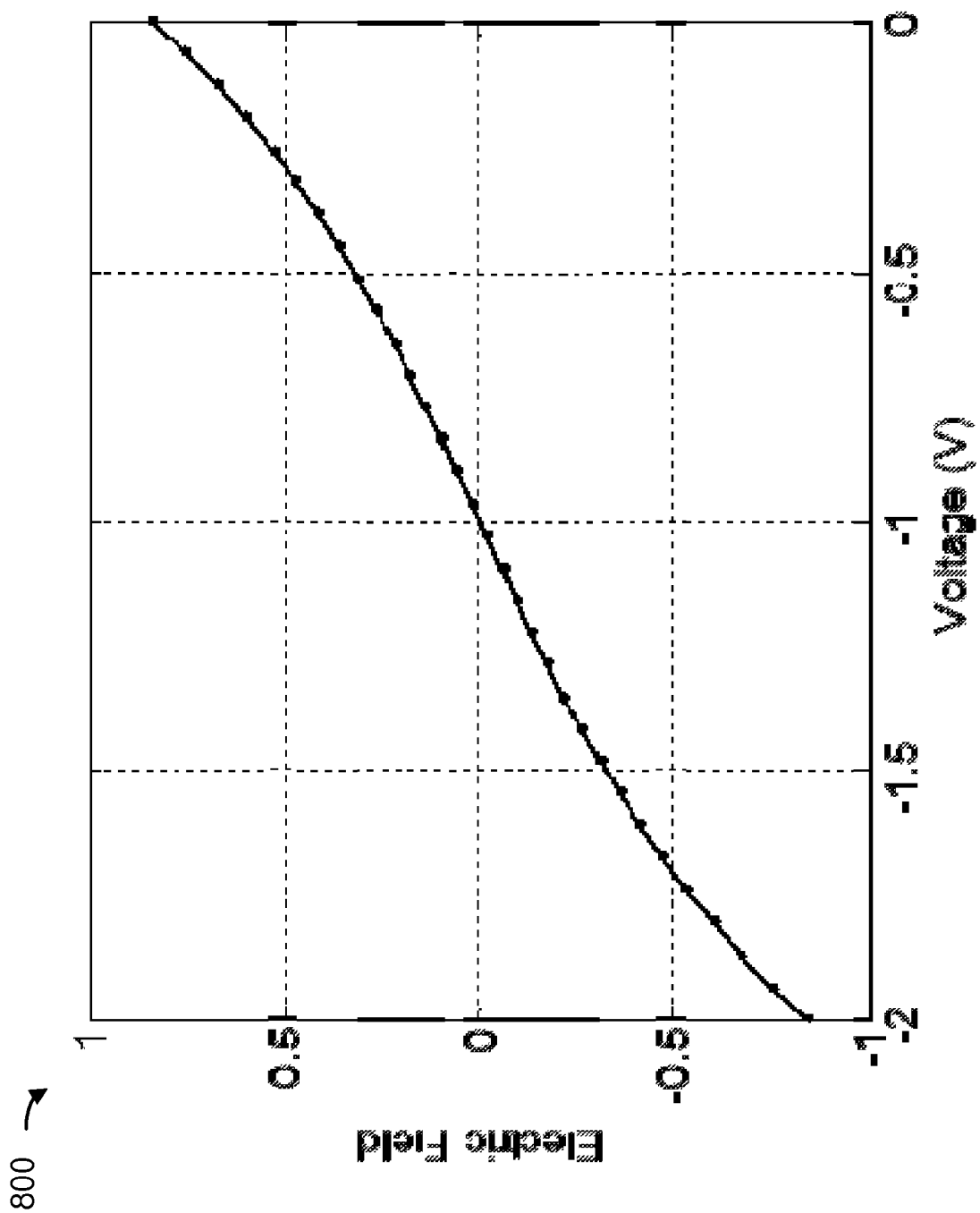
FIG. 8 illustrates an example of a graph showing a curve of electric field versus voltage.

FIG. 8 illustrates an example of a graph 800 showing a curve of electric field versus voltage. Graph 800 shows an example curve for the real part of the electric field versus RF voltage applied. This curve is different than the typical sin(x) curve associated with phase-modulator-based nested Mach-Zehnder structures. In this case, one of the EAMs has a voltage from −2 to 0 V applied in equal steps, and the other EAM (in the push-pull pair) has a voltage from 0 to −2V applied in the same equal steps. The exact mapping from voltages to constellation points in the complex plane may depend on the absorption and phase transfer functions of the EAM that is used. To produce the desired optical output modulation, TX DSP 310 may have knowledge of the transfer functions of modulator 340, and calculate the necessary voltages to apply to modulator 340.

While FIG. 8 shows graph 800 as having a particular curve, in some implementations, graph 800 may have a different curve.

Figure 9:
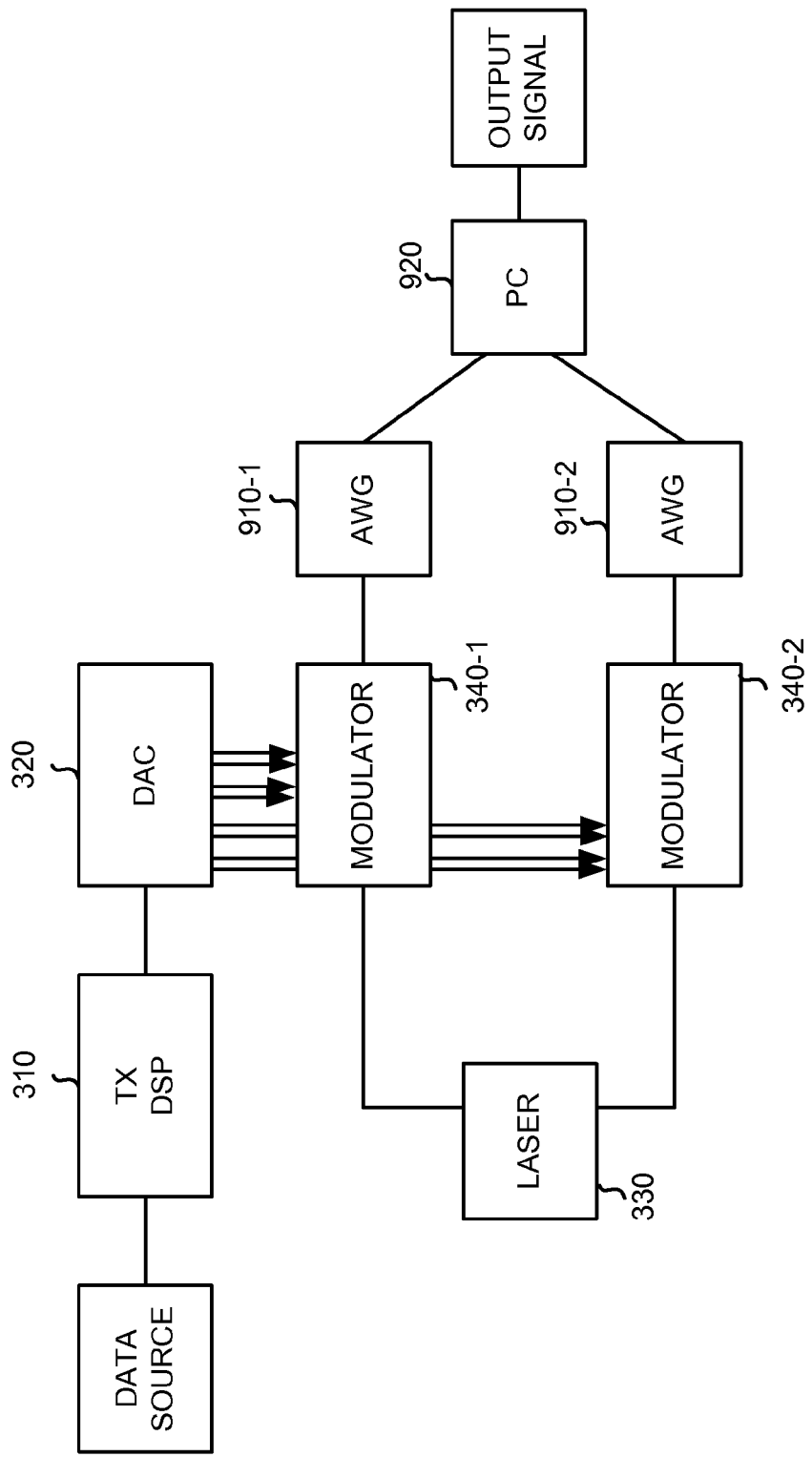
FIG. 9 is a diagram illustrating another example set of components of an optical transmitter shown in FIG. 2.

FIG. 9 is a diagram illustrating another example of components of an optical transmitter 212. As shown in FIG. 9, optical transmitter 212 may include a TX DSP 310, DAC 320, a laser 330, modulators 340-1 and 340-2 (referred to generally as modulators 340 and individually as modulator 340), AWG 910-1 and 910-2 (referred to generally as AWGs 910 and individually as AWG 910), and polarization combiner (PC) 920. TX DSP 310, DAC 320, laser 330, and modulators 340 may correspond to like components described with regard to FIG. 3.

In some implementations, laser 330 may include a dual output (e.g., two-sided) laser that provides two outputs of laser light: one for the first polarization and one for the second polarization. In some implementations, the two outputs of light may have approximately equal power. Laser 330 may output one output of light to modulator 340-1 and another output of light to modulator 340-2.

In some other implementations, laser 330 may include a single output laser and a splitter that splits the laser light into first and second portions of light: one for the first polarization and one for second polarization. In some example implementations, the two portions of light may have approximately equal power. The splitter may output one portion of light to modulator 340-1 and another portion of light to modulator 340-2. In some other implementations, the splitter may split the light, from laser 330, F times for F corresponding modulators 340 when F orthogonal states of polarization are needed for the output signal.

Modulator 340-1 may be used to modulate signals having the first polarization. Modulator 340-2 may be used to modulate signals having the second polarization. DAC 320 may provide separate voltage signals to modulators 340-1 and 340-2. In some other implementations, separate DACs 320 may be used: a first DAC 320 may be associated with the first polarization, and a second DAC 320 may be associated with the second polarization. In these other implementations, the first DAC 320 may supply voltage signals (e.g., differential signals) to modulator 340-1, and the second DAC 320 may supply voltage signals (e.g., differential signals) to modulator 340-2.

AWG 910 may include an arrayed waveguide grating or another type of optical multiplexer. AWG 910 may receive optical signals from modulator 340 (and other modulators 340—not shown) and combine the optical signals to produce an output signal. In some implementations, AWG 370 may also perform filtering on the optical signals to reduce or eliminate the unwanted distortion produced by modulator(s) 340.

In some implementations, AWG 910-1 may be associated with the first polarization, and AWG 910-2 may be associated with the second polarization. In some example implementations, AWG 910-1 may be designed to filter out optical signals having the second polarization, and AWG 910-2 may be designed to filter out optical signals having the first polarization.

Polarization combiner 920 may include an optical combiner, such as a polarization beam combiner. Polarization combiner 920 may receive the output signals from AWGs 910 and polarization combine the output signals to produce a dual-polarization output signal for transmission on an optical fiber, such as link 230.

While FIG. 9 shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, AWGs 910, and/or polarization combiners 920 may be selected to implement an optical transmitter 212 with the desired characteristics. In some instances, one of the components illustrated in FIG. 9 may perform a function described herein as being performed by another one of the components illustrated in FIG. 9.

Figure 10:
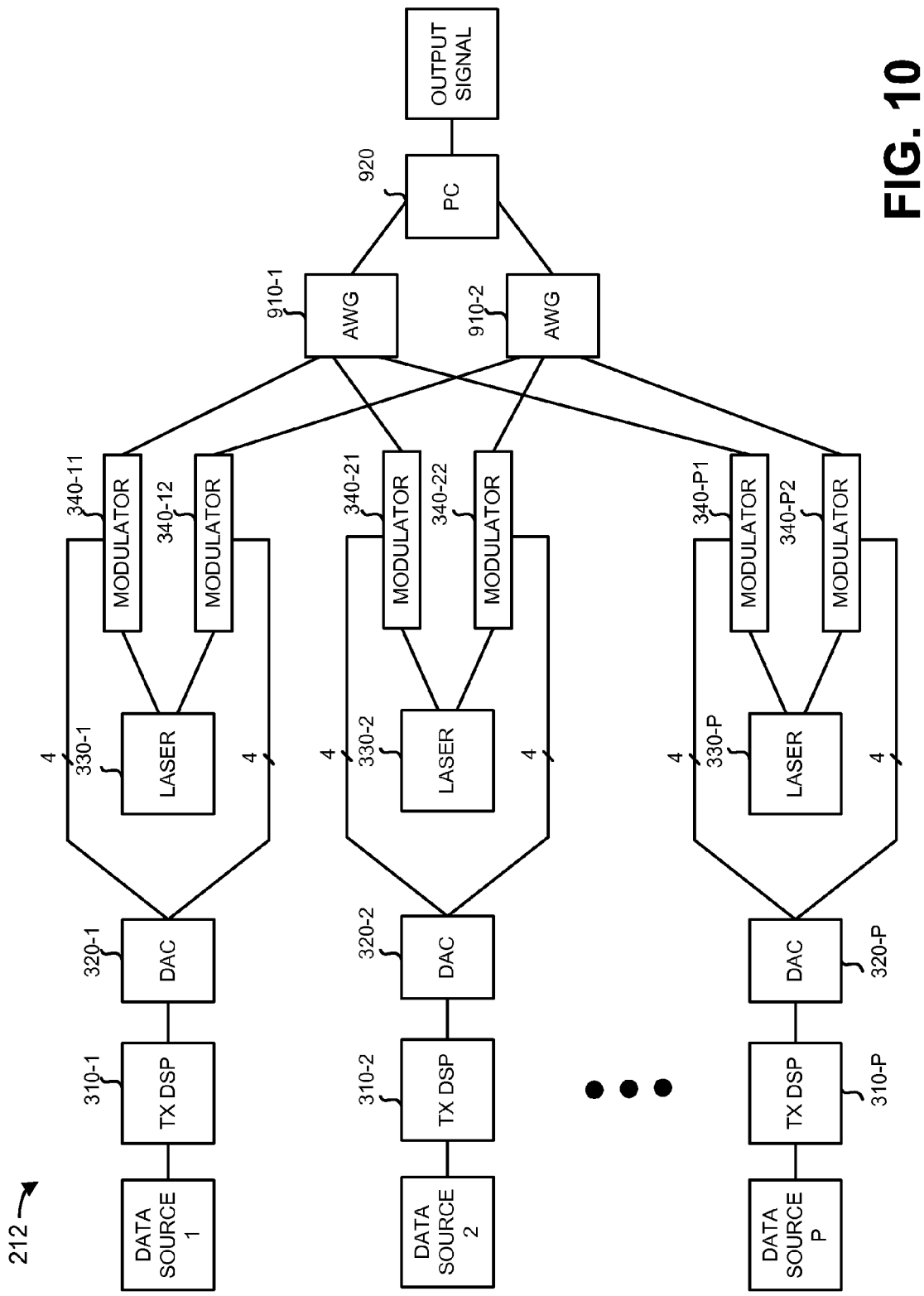
FIG. 10 is a diagram illustrating a further example set of components of an optical transmitter shown in FIG. 2.

FIG. 10 is a diagram illustrating a further example of components of an optical transmitter 212. As shown in FIG. 10, optical transmitter 212 may include a TX DSPs 310-1 through 310-P (P>1) (referred to generally as TX DSPs 310 and individually as TX DSP 310), DACs 320-1 through 320-P (referred to generally as DACs 320 and individually as DAC 320), lasers 330-1 through 330-P (referred to generally as lasers 330 and individually as laser 330), modulators 340-11 through 340-P2 (referred to generally as modulators 340 and individually as modulator 340), AWGs 910-1 and 910-2 (referred to generally as AWGs 910 and individually as AWG 910), and polarization combiner 920. TX DSPs 310, DACs 320, lasers 330, and modulators 340 may correspond to like components described with regard to FIG. 3. AWGs 910 and polarization combiner 920 may correspond to like components described with regard to FIG. 9.

In this particular implementation, each pair of modulators 340 (e.g., modulators 340-11 and 340-12, modulators 340-21 and 340-22, and modulators 340-P1 and 340-P2) may modulate signals having different polarizations. For example, modulators 340-11, 340-21, through 340-P1 may be used to modulate signals having the first polarization. Modulators 340-12, 340-22, through 340-P2 may be used to modulate signals having the second polarization. In some implementations, a DAC 320 may produce voltage signals for both the first polarization and the second polarization, or each DAC 320 may represent multiple DACs that each may produce voltage signals for a particular polarization but not both polarizations.

In some implementations, AWG 910-1 may combine optical signals having the first polarization, and AWG 910-2 may combine optical signals having the second polarization. AWG 910-1 may produce a combined optical signal having the first polarization, and AWG 910-2 may produce a combined optical signal having the second polarization. Polarization combiner 920 may receive and combine these combined optical signals to produce an output signal for transmission on an optical fiber, such as line 230.

While FIG. 10 shows optical transmitter 212 as including a particular quantity and arrangement of components, in some implementations, optical transmitter 212 may include additional components, fewer components, different components, or differently arranged components. The quantity of TX DSPs 310, DACs 320, lasers 330, modulators 340, AWGs 910, and polarization combiners 920 may be selected to implement an optical transmitter 212 with the desired characteristics. In some instances, one of the components illustrated in FIG. 10 may perform a function described herein as being performed by another one of the components illustrated in FIG. 10.

Figure 11:
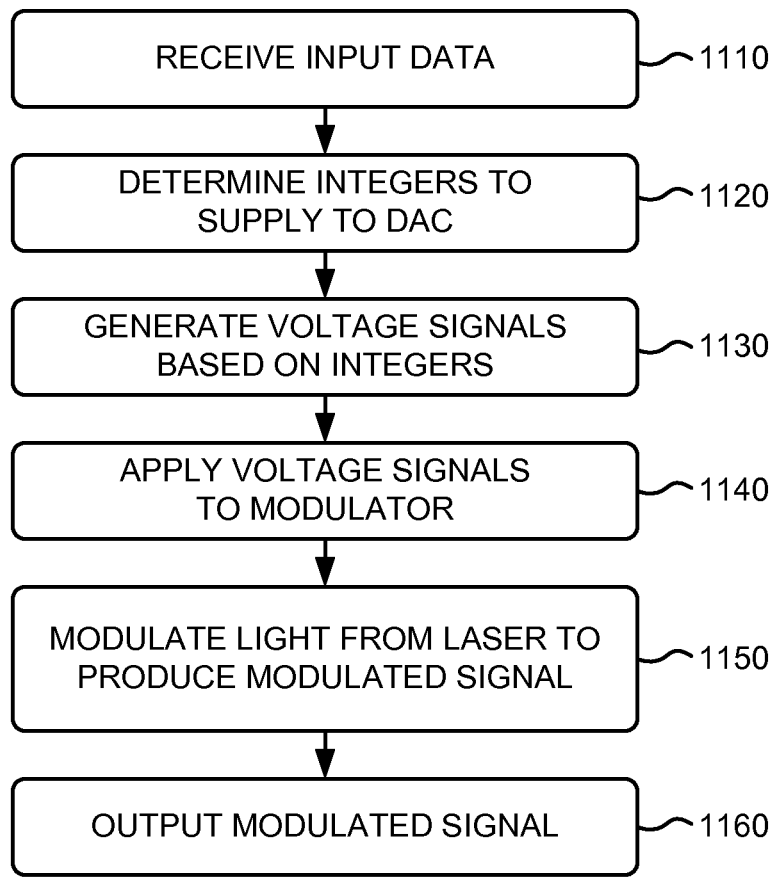
FIG. 11 is a flowchart of an example process that may be performed by an optical transmitter module of FIG. 2.

FIG. 11 is a flowchart of an example process 1100 that may be performed by transmitter module 210. Process 1100 will be described with corresponding references to FIG. 3.

Process 1100 may include receiving input data (block 1110). For example, TX DSP 310 may receive input data from a data source, such as an integrated circuit, a circuit board connector, or a back-plane connector. The data source may output one or more streams of data, which may be processed by TX DSP 310.

Process 1100 may include determining the integers to supply to the DAC (block 1120). For example, TX DSP 310 may determine the signals to apply to modulator 340 to generate the desired optical signal. TX DSP 310 may receive the input data, and using an FFT, an IFFT, and/or a look-up table, determine a sequence of integers to supply to DAC 320. In some implementations, TX DSP 310 may apply forward error correction to the input data. In some implementations, TX DSP 310 may introduce time skew to compensate for time skew introduced in link 230.

Process 1100 may include generating voltage signals based on the integers (block 1130) and applying the voltage signals to the modulator (block 1140). For example, DAC 320 may receive the sequence of integers and, based on the sequence of integers, generate the voltage signals to apply to modulator 340 using digital-to-analog conversion. DAC 320 may apply the voltage signals to modulator 340.

Process 1100 may include modulating light from a laser to provide a modulated signal (block 1150), and outputting the output signal (block 1160). For example, modulator 340 may receive light from laser 330 and the voltage signals from DAC 320, and may modulate the light to provide a modulated signal. Modulator 340 may output the modulated signal on an optical fiber, such as link 230.

While FIG. 11 shows process 1100 as including a particular quantity and arrangement of blocks, in some implementations, process 1100 may include fewer blocks, additional blocks, or a different arrangement of blocks. Additionally, or alternatively, some of the blocks may be performed in parallel.

Figure 12:
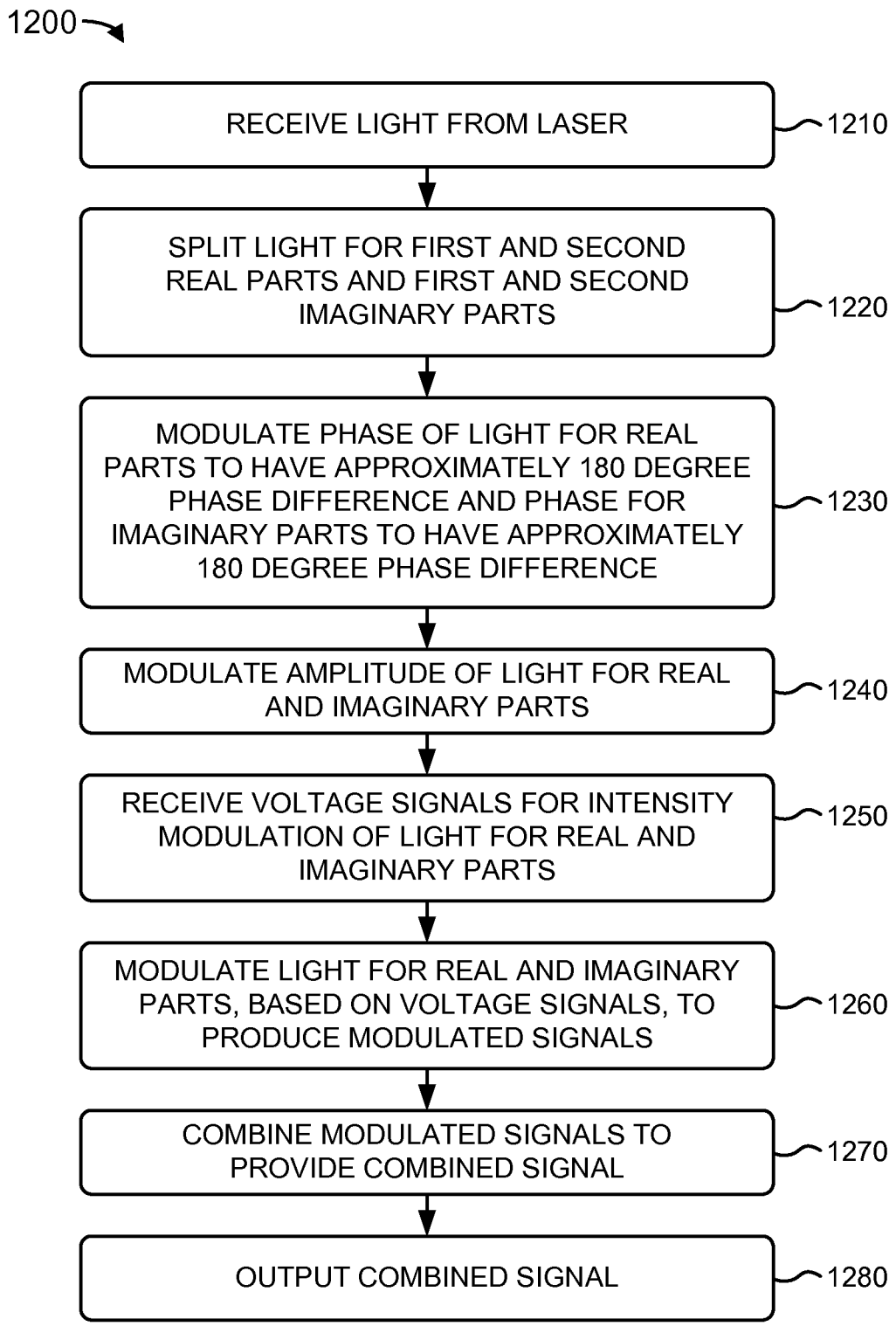
FIG. 12 is a flowchart of an example process that may be performed by a modulator of FIG. 5.

FIG. 12 is a flowchart of an example process 1200 that may be performed by modulator 340. In some implementations, process 1200 may correspond to block 1150 of process 1100 of FIG. 11. Process 1200 will be described with corresponding references to FIG. 5.

Process 1200 may include receiving light from a laser (block 1210) and splitting the light for first and second real parts and for first and second imaginary parts (block 1220).

For example, splitter 510 may receive light from laser 310 and split the light into four portions of light: first and second portions for the real parts and third and fourth portions for the imaginary parts. In some implementations, splitter 510 may split the light so that the each of the portions of light has approximately equal power. In some other implementations, splitter 510 may split the light so that the each of the portions has an unequal amount of power. Splitter 510 may output the first portion of light to an upper-most modulator branch, the second portion of light to the next-upper-most modulator branch, the third portion of light to the next-lower-most modulator branch, and the fourth portion of light to the lower-most modulator branch.

Process 1200 may include modulating a phase of the light for the real parts to have approximately one hundred eighty (180) degree phase difference and a phase of the light for the imaginary parts to have approximately one hundred eighty (180) degree phase difference (block 1230). For example, each phase modulator 522 may modulate a phase of the respective portion of light.

In some implementations, phase modulator 522, of the first and second modulator branches, may impart phases such that the difference in phases between the first and second modulator branches is approximately one hundred eighty (180) degrees; and phase modulators 522, of the third and fourth modulator branches, may impart phases such that the difference in phases between the third and fourth modulator branches is approximately one hundred eighty (180) degrees.

In some example implementations, phase modulators 522, of the first and second modulator branches, may impart phases such that the difference in phases between one of the first and second modulator branches and one of the third and fourth modulator branches is approximately ninety (90) degrees; and phase modulators 522, of the third and fourth modulator branches, may impart phases such that the difference in phases between one of the third and fourth modulator branches and one of the first and second modulator branches is approximately ninety (90) degrees.

In some other implementations, the modulator branches may impart different degrees of phase having some other phase difference between the modulator branches.

Process 1200 may include modulating an amplitude of the light for the real parts and the imaginary parts (block 1240). For example, each amplitude modulator 524 may modulate an amplitude of a respective portion of light from a respective one of phase modulators 522. In some implementations, amplitude modulator 524, of the modulator branches, may modulate the amplitude of the portions of light to have approximately equal amplitude.

Process 1200 may include receiving voltage signals for intensity modulation of the light for the real parts and the imaginary parts (block 1250), and modulating the light for the real parts and the imaginary parts, based on the voltage signals to produce modulated signals (block 1260). For example, each intensity modulator 526 may modulate an intensity of a respective portion of light from a respective one of amplitude modulators 524 based on a respective voltage signal from a DAC 320. Each intensity modulator 526 may provide a modulated signal. Thus, intensity modulator 526, of the first modulator branch, may provide a first modulated signal; intensity modulator 526, of the second modulator branch, may provide a second modulated signal; intensity modulator 526, of the third modulator branch, may provide a third modulated signal; and intensity modulator 526, of the fourth modulator branch, may provide a fourth modulated signal.

Process 1200 may include combining the modulated signal to provide a combined signal (block 1270), and outputting the combined signal as a modulated signal (block 1280). For example, combiner 530 may receive the first, second, third, and fourth modulated signals from the modulator branches, and combine the first, second, third, and fourth optical signals to provide a combined signal. Combiner 530 may output the combined signal as a modulated signal.

While FIG. 12 shows process 1200 as including a particular quantity and arrangement of blocks, in some implementations, process 1200 may include fewer blocks, additional blocks, or a different arrangement of blocks. Additionally, or alternatively, some of the blocks may be performed in parallel.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system, comprising:
   a transmitter module comprising:
      a laser configured to output light; and
      an optical modulator comprising:
         a splitter configured to:
            receive the light, and
            split the light into a plurality of portions of the light,
         a plurality of phase modulators configured to:
            receive the plurality of portions of the light, and
            modulate phases of the plurality of portions of the light at a first frequency to provide a plurality of phase-modulated signals,
         a plurality of amplitude modulators configured to:
            receive the plurality of phase-modulated signals, and
            modulate amplitudes of the plurality of phase-modulated signals at a second frequency to provide a plurality of amplitude-modulated signals,
         a plurality of intensity modulators configured to:
            receive the plurality of amplitude-modulated signals, and
            modulate intensities of the plurality of amplitude-modulated signals at a third frequency that is greater than the first and second frequencies to provide a plurality of intensity-modulated signals,
            the plurality of intensity modulators including a first intensity modulator and a second intensity modulator, such that the modulation of the intensities of the plurality of amplitude-modulated signals is applied by a push-pull arrangement between the first and second intensity modulators, and
         a combiner configured to:
            receive the plurality of intensity-modulated signals,
            combine the plurality of intensity-modulated signals into a combined signal, and
            output the combined signal,
   where the plurality of portions of the light includes a first portion of light, a second portion of light, a third portion of light, and a fourth portion of light, and
   the plurality of phase modulators including:
      a first phase modulator configured to receive the first portion of light and modulate a phase of the first portion of light to provide a first phase-modulated signal having a first degree of phase,
      a second phase modulator configured to receive the second portion of light and modulate a phase of the second portion of light to provide a second phase-modulated signal having a second degree of phase,
   where the plurality of amplitude modulators includes:
      a first amplitude modulator configured to receive the first phase-modulated signal and modulate an amplitude of the first phase-modulated signal to provide a first amplitude-modulated signal having a first amplitude,
      a second amplitude modulator configured to receive the second phase-modulated signal and modulate an amplitude of the second phase-modulated signal to provide a second amplitude-modulated signal having a second amplitude,
      a third amplitude modulator configured to receive the third phase-modulated signal and modulate an amplitude of the third phase-modulated signal to provide a third amplitude-modulated signal having a third amplitude, and
      a fourth amplitude modulator configured to receive the fourth phase-modulated signal and modulate an amplitude of the fourth phase-modulated signal to provide a fourth amplitude-modulated signal having a fourth amplitude,
   where the first intensity modulator configured to receive the first amplitude-modulated signal and modulate an intensity of the first amplitude-modulated signal to provide a first intensity-modulated signal having a first intensity, the second intensity modulator configured to receive the second amplitude-modulated signal and modulate an intensity of the second amplitude-modulated signal to provide a second intensity-modulated signal having a second intensity, the plurality of intensity modulators further includes:
      a third intensity modulator configured to receive the third amplitude-modulated signal and modulate an intensity of the third amplitude-modulated signal to provide a third intensity-modulated signal having a third intensity, and
      a fourth intensity modulator configured to receive the fourth amplitude-modulated signal and modulate an intensity of the fourth amplitude-modulated signal to provide a fourth intensity-modulated signal having a fourth intensity,
   the combiner combining the first intensity-modulated signal, the second intensity-modulated signal, the third intensity-modulated signal, and the fourth intensity-modulated signal to provide the combined signal.

2. The optical system of claim 1, where the transmitter module further comprises:
a processor configured to:
receive input data, and
generate input values based on the input data; and
a digital-to-analog converter configured to:
receive the input values from the processor,
generate voltage signals based on the input values, and
output the voltage signals to the plurality of intensity modulators,
the plurality of intensity modulators modulating the intensities of the plurality of amplitude-modulated signals based on the voltage signals output by the digital-to-analog converter.

3. The optical system of claim 2, where the processor is one of a plurality of processors, the digital-to-analog converter is one of a plurality of digital-to-analog converters, the laser is one of a plurality of lasers, and the optical modulator is one of a plurality of optical modulators, the plurality of processors, the plurality of digital-to-analog converters, the plurality of lasers, and the plurality of optical modulators being implemented on at least one of one or more application specific integrated circuits or one or more photonic integrated circuits.

4. The optical system of claim 1, where the first degree of phase is approximately 180 degrees out-of-phase with respect to the second degree of phase, the third degree of phase is approximately 180 degrees out-of-phase with respect to the fourth degree of phase, the first degree of phase is approximately +/−90 degrees out-of-phase with respect to the third degree of phase, and the second degree of phase is approximately +/−90 degrees out-of-phase with respect to the fourth degree of phase.

5. The optical system of claim 1, where each of the plurality of amplitude modulators corresponds to a respective one of the plurality of phase modulators and a respective one of the plurality of intensity modulators.

6. An optical modulator comprising:
a splitter configured to:
receive light, and
split the light into a plurality of portions of the light;
a plurality of phase modulators, each of the plurality of phase modulators being configured to:
receive a corresponding one of the plurality of portions of the light, and
modulate a phase of the corresponding one of the plurality of portions of the light at a first frequency to provide a phase-modulated signal of a plurality of phase-modulated signals;
a plurality of amplitude modulators, each of the plurality of amplitude modulators being configured to:
receive a corresponding one of the plurality of phase-modulated signals, and
modulate an amplitude of the corresponding one of the plurality of phase-modulated signals a second frequency to provide an amplitude-modulated signal of a plurality of amplitude-modulated signals;
a plurality of intensity modulators, each of the plurality of intensity modulators being configured to:
receive a corresponding one of the plurality of amplitude-modulated signals, and
modulate an intensity of a corresponding one of the plurality of amplitude-modulated signals at a third frequency greater than the first and second frequencies to provide an intensity-modulated signal of a plurality of intensity-modulated signals,
the plurality of intensity modulators including a first intensity modulator and a second intensity modulator, such that the modulation of the intensities of the plurality of amplitude-modulated signals is applied by a push-pull arrangement between the first and second intensity modulators; and
a combiner configured to:
receive the plurality of intensity-modulated signals,
combine the plurality of intensity-modulated signals into a combined signal, and
output the combined signal,
where the plurality of portions of the light includes a first portion of light, a second portion of light, a third portion of light, and a fourth portion of light, and
the plurality of phase modulators including:
a first phase modulator configured to receive the first portion of light and modulate a phase of the first portion of light to provide a first phase-modulated signal having a first degree of phase,
a second phase modulator configured to receive the second portion of light and modulate a phase of the second portion of light to provide a second phase-modulated signal having a second degree of phase,
a third phase modulator configured to receive the third portion of light and modulate a phase of the third portion of light to provide a third phase-modulated signal having a third degree of phase, and
a fourth phase modulator configured to receive the fourth portion of light and modulate a phase of the fourth portion of light to provide a fourth phase-modulated signal having a fourth degree of phase,
the first degree of phase, the second degree of phase, the third degree of phase, and the fourth degree of phase being different from each other,
where the plurality of amplitude modulators includes:
a first amplitude modulator configured to receive the first phase-modulated signal and modulate an amplitude of the first phase-modulated signal to provide a first amplitude-modulated signal having a first amplitude,
a second amplitude modulator configured to receive the second phase-modulated signal and modulate an amplitude of the second phase-modulated signal to provide a second amplitude-modulated signal having a second amplitude,
a third amplitude modulator configured to receive the third phase-modulated signal and modulate an amplitude of the third phase-modulated signal to provide a third amplitude-modulated signal having a third amplitude, and
a fourth amplitude modulator configured to receive the fourth phase-modulated signal and modulate an amplitude of the fourth phase-modulated signal to provide a fourth amplitude-modulated signal having a fourth amplitude,
where the first intensity modulator is configured to receive the first amplitude-modulated signal and a first voltage signal from a digital-to-analog converter, and modulate an intensity of the first amplitude-modulated signal, based on the first voltage signal, to provide a first intensity-modulated signal having a first intensity, the second intensity modulator is configured to receive the second amplitude-modulated signal and a second voltage signal from the digital-to-analog converter, and modulate an intensity of the second amplitude-modulated signal, based on the second voltage signal, to provide a second intensity-modulated signal having a second intensity, the plurality of intensity modulators further includes:

a third intensity modulator configured to receive the third amplitude-modulated signal and a third voltage signal from the digital-to-analog converter, and modulate an intensity of the third amplitude-modulated signal, based on the third voltage signal, to provide a third intensity-modulated signal having a third intensity, and a fourth intensity modulator configured to receive the fourth amplitude-modulated signal and a fourth voltage signal from the digital-to-analog converter, and modulate an intensity of the fourth amplitude-modulated signal, based on the fourth voltage signal, to provide a fourth intensity-modulated signal having a fourth intensity, the combiner combining the first intensity-modulated signal, the second intensity-modulated signal, the third intensity-modulated signal, and the fourth intensity-modulated signal to provide the combined signal.

7. The optical modulator of claim 6, where the first degree of phase is approximately 180 degrees out-of-phase with respect to the second degree of phase, the third degree of phase is approximately 180 degrees out-of-phase with respect to the fourth degree of phase, the first degree of phase is approximately +/−90 degrees out-of-phase with respect to the third degree of phase, and the second degree of phase is approximately +/−90 degrees out-of-phase with respect to the fourth degree of phase.

* * * * *